Dec. 18, 1928.  
C. SKLAREK  
1,695,509  
DIRIGIBLY MOUNTED LIGHT  
Original Filed Sept. 29, 1921   2 Sheets-Sheet 1
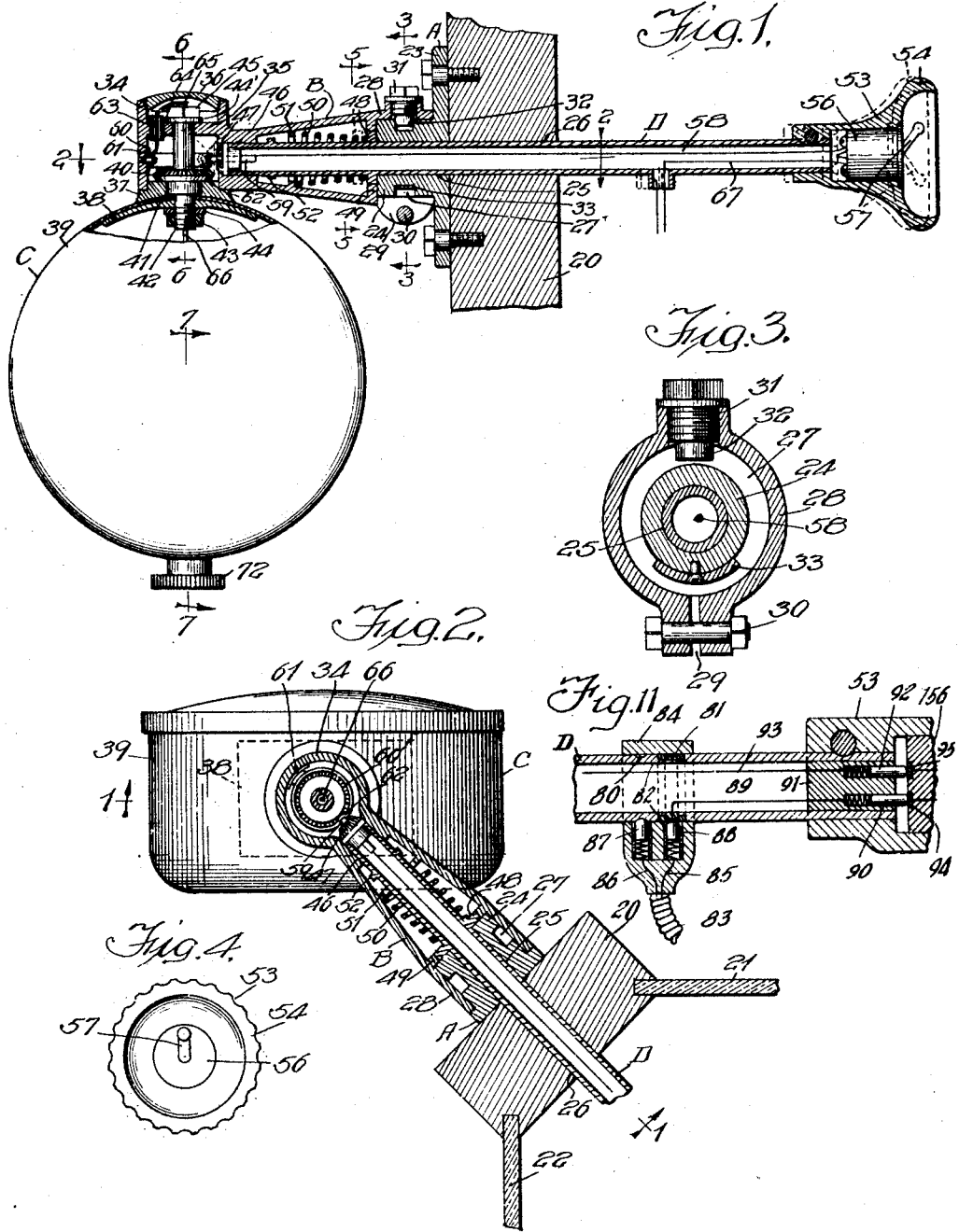
Witnesses  
W. F. Kilroy
Inventor:  
Clifford Sklarek  
By Geo. I. Haight  
His Attys.

Dec. 18, 1928. 1,695,509
C. SKLAREK
DIRIGIBLY MOUNTED LIGHT
Original Filed Sept. 29, 1921  2 Sheets-Sheet 2
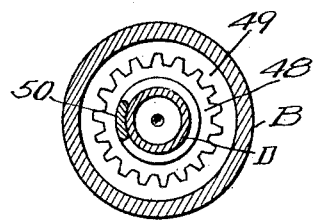
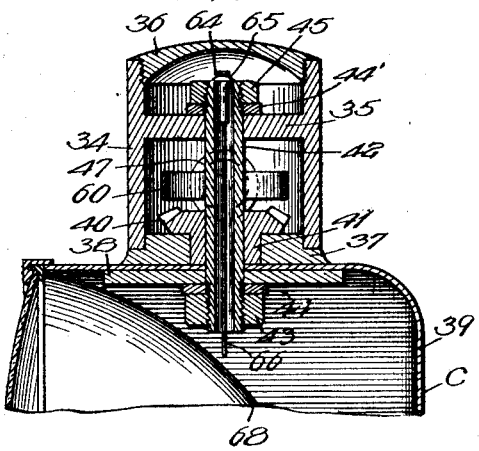
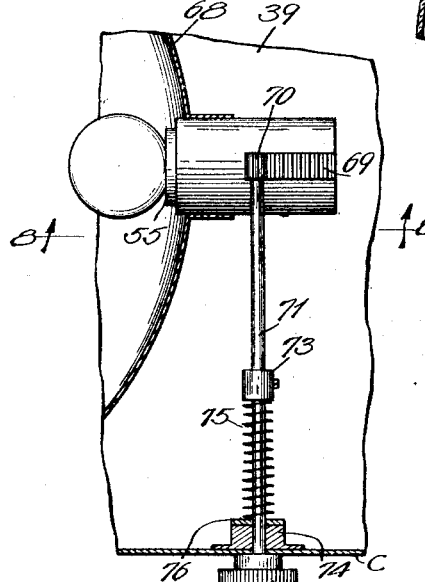
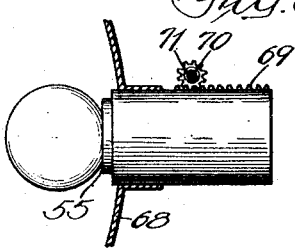
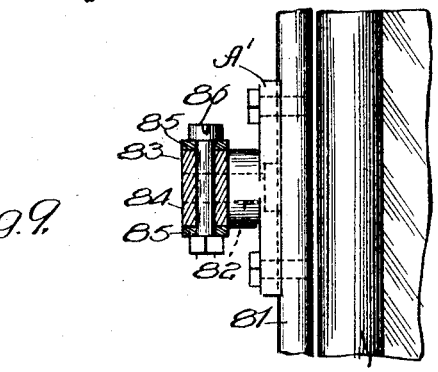
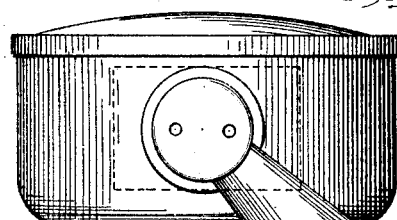
Inventor
Clifford Sklarek Patented Dec. 18, 1928.

1,695,509

UNITED STATES PATENT OFFICE.

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS.

DIRIGIBLY-MOUNTED LIGHT.

Application filed September 29, 1921, Serial No. 504,194. Renewed June 9, 1928.

This invention relates to improvements in dirigibly mounted lights, and more particularly to dirigibly mounted lights adapted to be employed as a spotlight mounted on the wind shield of an open automotive vehicle or on the superstructure of a closed type of automobile.

One object of the invention is to provide a light which is universally adjustable by means of a single operating element and more particularly such a light adapted to be employed as a spotlight for automobiles and other automotive vehicles.

Another object of the invention is to provide a universally adjustable light of the character indicated which is of compact form, attractive appearance, weather-protected, easily attachable to automobiles of either the open or closed types, and one wherein the operating member is conveniently positioned for manipulation by the driver.

Other objects of the invention will more clearly appear from the description and claims hereinafter following.

In the drawings forming a part of this specification, Figure 1 is a vertical sectional view, taken diagonally through the corner post of the superstructure of a closed type of automobile and showing my improvements in connection therewith. Figure 2 is a horizontal sectional view of the structure illustrated in Figure 1 and corresponding substantially to the section line 2—2 thereof, a part at the inner end of the operating element being broken away. Figure 3 is an enlarged vertical sectional view illustrating certain details of construction and corresponding substantially to the line 3—3 of Figure 1. Figure 4 is an end elevation of the operating element looking from the right toward the left, as viewed in Figure 1. Figures 5 and 6 are vertical sectional views upon an enlarged scale corresponding substantially to the section lines 5—5 and 6—6 of Figure 1. Figure 7 is an enlarged vertical sectional view illustrating the focus-adjusting means and corresponding substantially to the line 7—7 of Figure 1. Figure 8 is a horizontal sectional view corresponding to the line 8—8 of Figure 7. Figure 9 is a top plan view of another embodiment of my improvement showing the same as applied to the windshield structure of an open type of automobile, the windshield and top-supporting post being shown in horizontal section. Figure 10 is a vertical detailed sectional view corresponding to the section line 10—10 of Figure 9. And Figure 11 is an enlarged detail sectional view of a portion of the operating rod D illustrating certain details of an improved electrical system employed with my device.

Referring first to the construction illustrated in Figures 1 to 8 inclusive, 20 denotes the lefthand front corner post of the superstructure of a closed type of automobile such as a sedan or limousine, 21 the front glass or windshield and 22 the side glass.

In carrying out my invention, I employ, broadly, a supporting and securing bracket A; a housing proper B; a supplemental housing or lamp-holding member C; an operating rod or element D; and certain other details of construction hereinafter described.

The bracket A is preferably in the form of a casting having a vertically extending flange 23 by which it is adapted to be screwed or otherwise secured to the post 20; said bracket A is also provided with an outwardly extended integral hub 24 having a bearing 25 extending therethrough perpendicular to the post 20, the latter being also formed with an alined opening 26. The hub 24 is also provided with an annular groove 27 for the purpose hereinafter described.

The housing B has the main portion thereof preferably formed conical with the larger end adjacent the bracket A, said end as indicated at 28 being cylindrical and fitting over the hub 24. Said cylindrical end 28 is preferably slit at the bottom as indicated at 29 in Fig. 3, the split ends receiving a tightening bolt 30 therethrough so that the desired friction may be created between the housing B and the hub 24 to prevent accidental slippage or rotation of the housing B, the housing itself acting as a friction clamp, as will be understood. Threaded through the cylindrical end 28 at a point diametrically opposite the bolt 30 is a plug 31 having an inner reduced end 32 of cylindrical form which travels within the annular groove 27. With this construction, it will be obvious that the housing B is swivelled or rotatably mounted on the block A to turn on a horizontally extending axis.

In certain cities, ordinances are in effect which limit the field of the spotlight projection, in order to prevent directing a glare of light into the eyes of pedestrians or operators of oppositely moving vehicles. When it is desired to comply with such regulations, a simple stop in the form of an arcuate plate as indicated at 33 may be secured to the hub 24 within the groove 27 thereby limiting the turning movements of the housing B, it being evident that the end 32 of the bolt 31 will engage with the ends of the plate 33 for this purpose. By varying the length of the arcuate plate 33 and its location within the groove 27, it is evident that the light area may be varied as desired.

At its outer end, the housing B is formed with an integral section 34, the axis of which extends at right angles to the axis of the swivel or pivotal bearing of the housing. The cylindrical section 34 is open at the bottom and below the top is provided with an integral web or partition 35. The top portion of the cylindrical section 34 is interiorally threaded so as to provide for a detachable cap or cover 36.

The supplemental housing or lamp-holder C, in the instance shown, consists of the shouldered annular plate 37, clamping plate or washer 38 and the sheet metal housing 39 for the lamp proper. The three parts 37, 38 and 39 are rigidly clamped together as best illustrated in Fig. 6, by means of a bevel gear wheel 40 having a hub 41 extending through the disc 37, and a hollow shaft 42 threaded at its lower end to receive a nut 43 and nut washer 44. The shaft 42 is preferably shouldered to engage the upper face of the bevel gear 40 and it will be understood that the shaft 42, bevel gear 40, disc 37 and other parts of the housing proper for the lamp, are rigidly secured together and rotate in unison. The upper end of the shaft 42 is extended through the partition 35 which provides a bearing therefor and a nut and washer 45 and 44' are applied to the shaft so as to hold the parts up in place. As will be evident, the shouldered disc 37 provides a suitable rotatable bearing for the lamp-holder proper 39 adapting the latter to rotate about an axis which is perpendicular or transverse to the axis of rotation of the housing B.

The operating element D is of hollow tubular form and is journaled in the hub 24 as above described and also in the housing B in the section indicated at 46. At its inner end the element D has secured thereto a bevel gear 47 which is normally out of mesh with the bevel gear 40 but is adapted to be engaged with the latter upon reciprocation or axial movement of the operating element as indicated by the dotted lines in Fig. 1. Secured to the operating element D at a point normally against the hub 24 is a gear wheel clutch member 48 which is adapted to cooperate with a corresponding gear wheel clutch member 49 preferably formed integrally on the inner side of the housing B. A coil spring 50 of conical form is carried on the operating element D, one end of said spring bearing against the gear clutch member 48 and the other end against the inwardly extending annular flange 51 on the interior of the housing B. With this arrangement, it will be seen that the operating element D is normally held in its outermost position toward the right, as viewed in Fig. 1. Preferably an annular shoulder is formed on the operating element D as indicated at 52 in Fig. 1 to limit the inward movement of the operating element D and prevent damage to the parts particularly the bevel gears 40 and 46.

From the preceding description, it will be seen that, upon rotation of the element D when in its normal position, the entire lamp-support, comprising the housing B and supplemental housing C, will be rotated on a horizontal axis due to the meshing of the gear clutch members 48 and 49. When the operating element D is pushed inwardly a slight amount, sufficient to disengage the clutch members 48 and 49 and to engage the bevel gears 40 and 46, then rotation of the operating element D effects rotation of the supplemental housing C about its individual axis transverse to said horizontal axis. With this arrangement, an extremely efficient, convenient means is provided for obtaining the universal adjustment of the spotlight, the motions of the operating element for both rotations at right angles to each other being always the same, since the operating element D is limited to rotation about the axis fixed with respect to the bracket A and the superstructure of the car. For convenience in rotating the element D, the latter has applied to its outer free end a box-like casting 53 having an annular hand gripping flange 54 which may be suitably knurled.

The present common practice in spotlights is to employ an electric light proper as indicated conventionally at 55 in Fig. 7. To control the supply of electricity thereto in as convenient a manner as possible, I provide a switch block 56 mounted in the hollow casting 53, the switch block having a switch lever 57. One side of the light 55 is grounded and the circuit is completed by a wire 58 leading from the switch block 56 through the hollow operating element D. Said wire 58, at the inner end of the operating element D, is soldered or otherwise electrically united with a contact pin 59 extending axially through the bevel gear 46 in contact with a resilient contact ring 60 suitably supported and separated by a proper insulation, on the cylindrical section 34 of the housing B, as indicated at 61. Said resilient contact ring 60 preferably has a little depression 62 therein to insure the proper seating of the end of the contact pin 59 as best shown in Fig. 2. From the contact ring 61 is extended a wire 63 upwardly through a suitable insulating bushing 64 in the partition 35. The upper end of the wire 63 is terminated in a brush 64 which contacts with an insulated contact pin 65 having a rounded top and seated axially in the shaft 42, as best shown in Fig. 6. From the contact pin 65 is extended a wire 66 which leads to the proper contact on the base of the lamp 55. With this arrangement, it will be observed that an electric circuit can always be maintained regardless of the different relative positions of the various parts of the lamp structure. From the switch block 56 the circuit with the source of supply is effected by a wire 67 which leads out through a suitable opening provided in the element D as shown in Fig. 1.

It is often desirable to adjust the electric bulb in order to obtain the proper focus with respect to the usual parabolic mirror 68. For this purpose, the base of the electric bulb is formed on one side thereof with a short rack 69 with which meshes a small gear 70 carried on the upper end of a shaft 71 which is extended downwardly through the casing 39 and has a turning knob 72 thereon. To frictionally hold the shaft 71 against vibration and accidental turning, an adjustable collar 73 is applied thereto and between said collar and reinforcing bearing block 74 secured to the casing 39, is interposed a spring 75 and a friction washer 76, as shown in Fig. 7. By rotating the shaft 71, it is evident that the electric bulb can be adjusted inwardly and outwardly to the desired position.

Referring now to the arrangement shown in Figs. 9 and 10, the wind shield frame is indicated at 80 and the usual post at 81. In this instance, the bracket A' is applied to the post 81 and adjustably secured thereto on a horizontal axis by means of the concealed bolt 82 is a supplemental bracket 83. The latter has a lug 84 extending rearwardly therefrom, said lug being vertically perforated. The housing B' of the lamp structure is rotatably swivelled on a bracket A² in the same manner as shown in Fig. 1. Said bracket A² is provided with laterally extended upper and lower perforated ears 85—85 which straddle the lug 84, a bolt 86 effecting the pivotal connection therebetween. With this arrangement, it is evident that the housing B' and parts separated therefrom including the operating element D' are adjustable about a vertical axis on the bolt 86, thereby permitting the operating end of the element D' to be positioned convenient to the driver of the automobile.

As will be evident from the preceding description, the operating element D can be rotated indefinitely in the same direction. It is customary to bring the electric wire from the battery through a protected flexible cable and in order to avoid any possibility of the cable or wire therein becoming broken or kinked due to continued rotation of the operating element D in the same direction, I have provided the arrangement shown in Figure 11. As shown in said figure, the operating element D is provided with an annular groove 80 therein and with an annular contact ring 81 mounted flush with the surface of the element D and insulated therefrom by a suitable band of insulating material 82 seated in a groove provided therefor in the element D. A section of the cable for enclosing the wires for the spot light is indicated at 83 and the latter is attached to a block 84 of insulating material which surrounds and is freely rotatable on the tube-like operating element D. Two wires 85 and 86 come from the cable 83, the wire 86 being electrically connected with a spring-controlled plunger 87 adapted to work within the annular rounded groove 80. This forms the ground side of the circuit for the light, as will be obvious. The other wire 85 is electrically connected with a similar spring-pressed metal plunger 88 so located as to contact with the contact ring 81 from which is lead into the interior of the element D, a wire 89.

The wire 89 is electrically connected to a spring-controlled plunger 90 mounted in a block of insulating material 91 rigidly secured within the end of the tube operating element D. The block 91 also carries another spring-controlled contact pin or plunger 92 which is electrically connected with a wire 93 leading to the lamp as in the case of the wire 58 shown in Figure 1 and previously described. The two spring-pressed contact pins or plungers 90 and 92 are adapted to effect electrical contact with contact plates 94 and 95 respectively carried at the inner end of the switch block 156 which is mounted within the operating handle 53 as previously described in connection with Figure 1.

The electrical arrangement just described allows of a circuit always being obtained for the lamp regardless of the position of the spot light and it will be noted that there is no danger of the cable 83 or wires therefrom becoming stretched, broken or kinked since the lead-in block 84 will remain substantially stationary regardless of the rotation of the element D. In commercial practice, it will be observed that the operating element D can be passed through the post 20 of the automobile superstructure while the block 84 and handle 53 with its switch block 156 are removed. After the operating element D has been inserted through the post 20, the block 84 with the parts assembled therein is then slipped lengthwise of the operating rod until the contact pin 87 drops into the groove 80, thereby preventing accidental shifting of the block 84 lengthwise of the element D. The insulating block 91 carrying the contact pins 90 and 92 will of course be assembled within the operating element D before shipment and hence, by applying the handle 53 with the switch-block 156 therein to the operating element D, after the block 84 has been applied as above described, the electrical circuit can be completed. With this arrangement, there is practically no possibility of anyone assembling the parts incorrectly, the arrangement is exceedingly simple, compact and weather protected.

I have herein shown and described what I now consider the preferred manner of carrying out the invention but the same is merely illustrative and I contemplate all changes and modifications that come within the scope of the claims appended hereto.

I claim:

1. In a dirigible light, the combination with a supporting housing mounted for rotation about one axis and having driving means secured thereon, of a light holder mounted for rotation about an axis disposed at an angle to said first axis and having driving means secured thereon; and an operating member extending into said housing having a plurality of operating means fixed thereon, said means being shiftable into operative relation with the driving means on said support or said holder.

2. In a dirigible light, the combination with a bracket; of a housing rotatably mounted on said bracket to turn about one axis; a lamp holding member rotatably mounted on said housing to rotate about an axis transverse to said first named axis; a rotatable and axially movable operating element extending into the housing; co-acting clutch members fixed to said housing and element respectively; and co-acting gears fixed to said member and element respectively.

3. In a dirigible light, the combination with a bracket; of a housing swivelled thereon to rotate about one axis; an operating element extending axially from said housing and rotatable about said axis; cooperable means rigidly fixed to said housing and element respectively for effecting rotation of said housing upon rotation of said operating element; a lamp-holding member rotatably mounted on said housing about an axis perpendicular to said first named axis; and cooperable means rigidly fixed respectively to said operating element and said lamp-holding member for effecting rotation of the latter about its said axis upon rotation of said element about its axis.

4. In a dirigible light, the combination with a bracket; of a housing swivelled thereon to rotate about one axis; an operating element disposed axially of and extending into said housing and rotatable about said axis; cooperable means directly carried by said housing and element respectively for effecting rotation of said housing upon rotation of said operating element; a lamp-holding member rotatably mounted on said housing about an axis perpendicularly to said first named axis; cooperable means carried directly by said operating element and by said lamp-holding member respectively for effecting rotation of the latter about its said axis upon rotation of said element about its axis, said operating element being axially movable to alternately engage and disengage said first and second named cooperable means; and spring means normally holding said operating element in position to maintain cooperative relation of said first named cooperable means and inoperative relation with respect to said second named cooperable means.

5. In a dirigible light, the combination with a bracket; of a housing swivelled thereon to rotate about one axis; an operating element extending axially from said housing and rotatable about said axis; clutch elements directly fixed to said housing and operating element respectively for effecting rotation of the housing upon rotation of the element; a lamp-holding member rotatably mounted on said housing about an axis perpendicular to said first named axis; and cooperable bevel gears rigidly fixed to said operating element and said lamp-holding member respectively to effect rotation of the latter upon rotation of said element.

6. In a dirigible light, the combination with a supporting member; of a housing rotatably mounted on said supporting member about one axis; an electric lamp-holding member rotatably mounted on said housing about an axis transverse to the first named axis; a hollow operating element rotatable about said first named axis and movable axially; means for effecting rotation of said housing and said second named member about their respective axes upon rotation of said operating element; an electric lamp proper carried by the said second named member; a control-switch carried by said operating element; and electrical connections from said switch to said lamp proper housed within said operating element said housing and said second named member, said electrical connections including co-acting contact members fixed to the housing, lamp holding member and operating element respectively, whereby, said connections are operative in any axial position of the operating element.

7. In a dirigible light, the combination with a supporting bracket adapted to be secured to the superstructure of an automobile or the like; of a housing swivelled on said bracket to rotate about a substantially horizontally extending axis, said housing being hollow and having an inwardly extending flange-shoulder therein; an operating element rotatable about the axis of rotation of said housing and extending within the latter; a clutch element on the interior of said housing; a cooperable clutch element carried by said operating element; spring means interposed between said flange shoulder and said operating element adapted normally to maintain said clutch elements in cooperative relation but permitting axial movement of said operating element with respect to the housing; a lamp-holding member adjustably mounted on said housing; and cooperable means on said lamp-holding member and said operating element for effecting adjustment of said lamp holding member with respect to the housing.

8. In a dirigible spotlight, for automobiles of the closed type, the combination with a bracket adapted to be secured to a member of the automobile superstructure, said bracket having a journal bearing opening extending therethrough adapted to aline with a similar opening in the post; a housing rotatably mounted on said bracket about a substantially horizontally extending axis; a lamp-holding member rotatably mounted on said housing about an axis at right angles to said first named axis; an operating element journaled in said bearing and adapted to extend through the alined opening of the post to the interior of the automobile superstructure, said operating element being also axially movable; and cooperable means between said operating element and said housing and between said operating element and said lamp-holding member for effecting rotation of the housing and lamp-holding member about their respective axes upon rotation of said operating element.

9. In a dirigible light mounting, the combination with an adjustable lamp holder and a rotatable operating element therefor; of an electric lamp proper carried by said holder; and electrical connections to said lamp proper from a source of current outside of said operating element and through the latter to the said lamp proper, said electrical connections including, a relatively stationary lead-in contact means loosely rotatable with respect to and on said operating element, and a contact member carried by said operating element whereby the latter may be freely rotated without danger of breaking the connections between the source of current and the operating element.

10. In a dirigible light mounting, the combination with an adjustable lamp holder and a rotatable operating element therefor; of an electrical lamp proper carried by said holder; and electrical connections to said lamp proper from a source of current outside of said operating element and through the latter to the said lamp proper, said electrical connections including, a contact ring on the exterior of said element, a contact block loosely rotatably mounted on said element, a spring-controlled contact carried by said block and engageable with said ring, and connections carried from said ring through said element to the lamp proper.

11. In a dirigible light mounting, the combination with an adjustable lamp holder and a rotatable operating element therefor; of an electrical lamp proper carried by said holder; and electrical connections to said lamp proper from a source of current outside of said operating element and through the latter to the said lamp proper, said electrical connections including, a contact ring on the exterior of said element, a contact block loosely rotatably mounted on said element, a spring-controlled contact carried by said block and engageable with said ring, and connections carried from said ring through said element to the lamp proper, said latter connections including a manually controlled switch mounted on the operating element.

12. In a dirigible light mounting for automobile windshields and the like, the combination with a supporting bracket, and a lamp holder universally adjustable with respect to said bracket; of an operating element of hollow tubular form for effecting adjustment of the lamp holder; an electric lamp proper carried by said holder; an insulated contact ring on the exterior of said operating element; a lead-in block loosely rotatably mounted with respect to and on said operating element, said lead-in block having a spring-controlled contact pin engageable with said contact ring; means preventing accidental shifting of said lead-in block longitudinally of the operating element; a handle mounted on said operating element; a switch block mounted in said handle; insulated spring-controlled contact pins mounted on said operating element and adapted to effect electrical connection with said switch when the latter is applied with the handle on the operating element; and electric wire connections from said contact ring to one of said last named contact pins and from the other of said last named contact pins to the lamp proper.

13. In a dirigible light mounting, the combination with a support; of a hollow member rotatable thereon about one axis; a second member rotatably mounted on the first member about an axis transverse to the first named axis, said second member having a hollow spindle extending axially therefrom into the first named member; a hollow operating member rotatably mounted axially within said first named member and adjustable axially thereof; cooperable gears on said spindle and the adjacent end of said operating member; an insulated contact pin mounted in the end of said operating member adjacent the spindle and projecting from the operating member toward the spindle; a resilient contact element carried by said first named member and insulated therefrom and with which said contact pin engages in any axial position of the operating member; a second contact pin mounted in said spindle and insulated therefrom and extending from the end thereof; a brush in contact with the extended end of said last named pin, said brush being electrically connected with said resilient contact element.

14. In a device of the character described, the combination with a lamp head adapted to house the light proper; of a support for said head provided with a partition; means for adjusting the lamp head to different positions, including a shaft carrying the lamp head, said shaft being rotatably supported by said partition; and means forming one side of an electric circuit to said lamp, said means including an insulated contact pin, carried axially by said shaft and extending slightly beyond one end thereof, and a contact brush fixedly secured to said support at one side of said partition and extending through said partition and being formed to effect axial engagement with the end of said pin.

15. In a device of the character described, the combination with a lamp head adapted to house the light proper; of a support for said head provided with a partition; means for moving the lamp head to different positions, including a shaft connected with the lamp head, said shaft being rotatably supported and extending from one side to the other of said partition; and means for forming one side of an electric circuit to said lamp, said means including an insulated contact pin carried axially by said shaft and extending slightly beyond one end thereof, and a contact brush mounted in said support and extending to opposite sides of said partition and having means at one side of said partition disposed in axial engagement with the adjacent end of said contact pin.

In witness that I claim the foregoing I have hereunto subscribed my name this 15th day of September 1921.

CLIFFORD SKLAREK.